(12) United States Patent
Toman

(10) Patent No.: US 6,177,655 B1
(45) Date of Patent: Jan. 23, 2001

(54) NON-STICK CERAMIC SLOW-COOKER AND METHOD FOR MAKING THE SAME

(75) Inventor: Joseph G. Toman, Cedarburg, WI (US)

(73) Assignee: Premark WB Holdings, Inc., Wilmington, DE (US)

( * ) Notice: Under 35 U.S.C. 154(b), the term of this patent shall be extended for 0 days.

(21) Appl. No.: 09/457,240

(22) Filed: Dec. 8, 1999

(51) Int. Cl.⁷ .................. B32B 7/02; A47J 36/04
(52) U.S. Cl. .................. 219/432; 219/433; 428/216
(58) Field of Search .................. 219/432, 433, 219/438; 428/213, 215, 216, 325

(56) References Cited

U.S. PATENT DOCUMENTS

| | | | |
|---|---|---|---|
| 3,806,701 | * 4/1974 | Scott | 219/438 |
| 3,881,090 | * 4/1975 | Scott | 219/433 |
| 3,908,111 | * 9/1975 | Bois et al. | 219/432 |
| 4,180,609 | * 12/1979 | Vassiliou | 428/216 |
| 4,591,530 | 5/1986 | Lui | 428/325 |
| 4,684,577 | 8/1987 | Coq | 428/447 |
| 5,071,695 | 12/1991 | Tannenbaum | 428/216 |
| 5,079,073 | * 1/1992 | Tannenbaum | 428/216 |
| 5,455,102 | 10/1995 | Tsai | 428/141 |
| 5,670,216 | 9/1997 | Oak et al. | 427/455 |
| 6,083,612 | * 7/2000 | Okita | 428/215 |

FOREIGN PATENT DOCUMENTS

3142312 * 5/1983 (DE) .
188065 * 7/1986 (EP) .
894541 * 2/1999 (EP) .

* cited by examiner

*Primary Examiner*—Joseph Pelham
(74) *Attorney, Agent, or Firm*—Michael Best & Friedrich LLP

(57) ABSTRACT

A method for making a non-stick ceramic cooking vessel for a slow-cooker, the vessel having glazing defining a seal over a cooking surface of the ceramic vessel, the method comprising the steps of removing at least a portion of the glazing while preferably maintaining at least a portion of the seal of the vessel and applying a non-stick coating over the cooking surface. The step of removing the glazing is preferably achieved by grit-blasting at least a portion of the glazing with aluminum oxide. Additionally, the cooking surface preferably includes a bottom surface and a wall surface wherein the glazing is preferably removed from the bottom surface such that the seal is substantially removed, and a portion of the glazing is preferably removed from the wall surface such that the seal there remains substantially intact. The method preferably also includes the steps of applying a first layer of a non-stick coating over the cooking surface, drying the first layer, cooling the first layer and applying a second layer of a non-stick coating over the first layer. Additionally, the method preferably includes the steps of applying a third layer of non-stick coating over the first and second layers, drying the second and third layers, and curing the layers of non-stick coating.

7 Claims, 2 Drawing Sheets

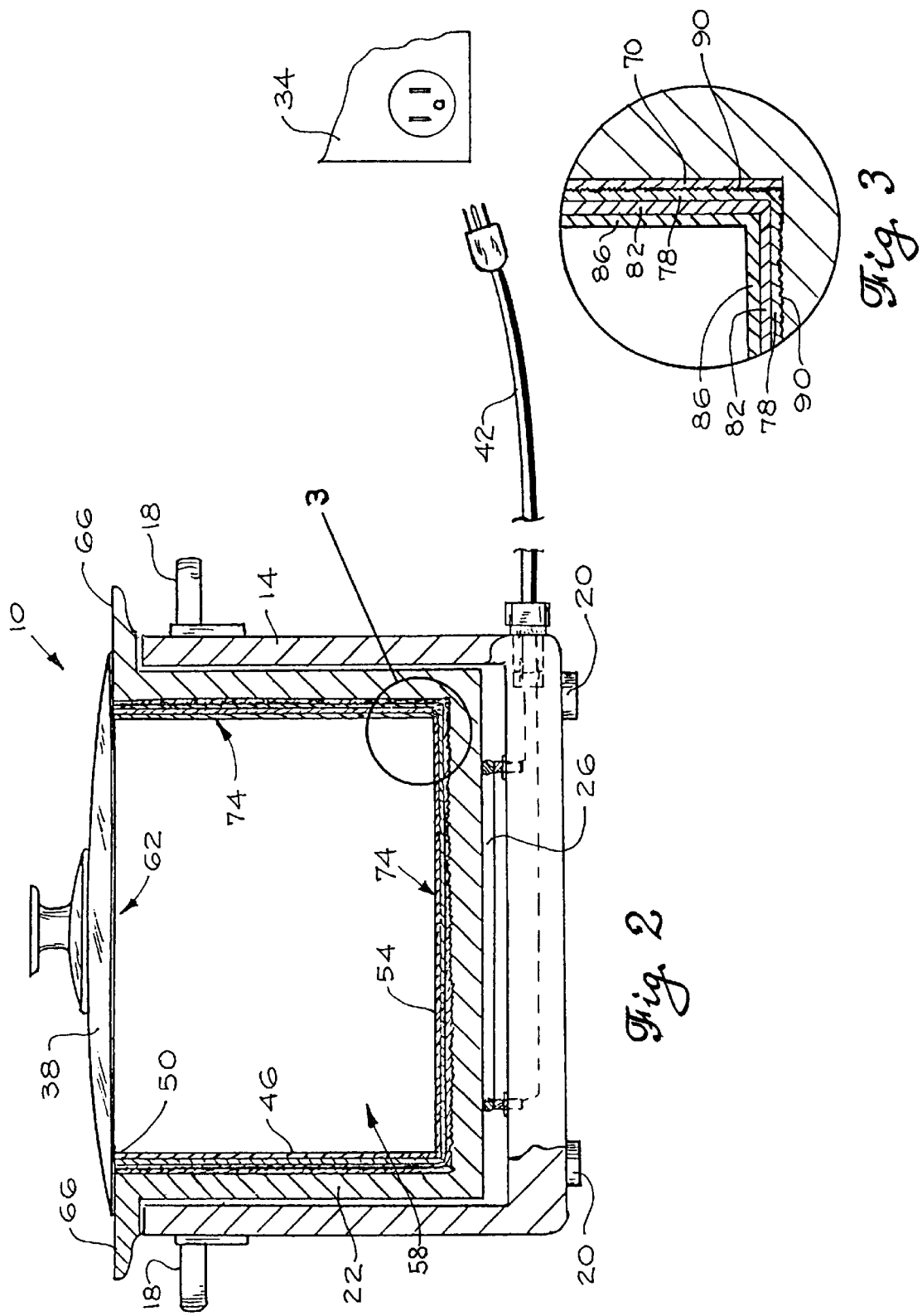

NON-STICK CERAMIC SLOW-COOKER AND METHOD FOR MAKING THE SAME

FIELD OF THE INVENTION

The invention relates to household cooking appliances, and more particularly to ceramic slow-cookers.

BACKGROUND OF THE INVENTION

Modern cookware is often coated with non-stick material to release food quickly and easily, making serving and clean-up less troublesome. Coating metal cookware has been relatively successful where multi-layered coating techniques have been used to improve the bond between the cooking surface and the non-stick coating.

Applying non-stick coatings to ceramic cookware has proven more difficult. The ceramic substrate of conventional ceramic cookware is usually glazed to seal the otherwise porous surfaces, but the glazing does not have the characteristics needed to provide the required non-stick surfaces. The glazing commonly hinders or prevents the application of non-stick coatings to the cooking surfaces. As such, food typically becomes baked onto conventional ceramic cookware, making serving and clean-up difficult. While ceramic cookware with a reliable and long-lasting non-stick coating would be extremely useful, it is currently unavailable on ceramic cookware such as baking dishes, casserole dishes, slow-cookers, etc.

Another problem with applying non-stick coatings to ceramic cookware is the temperature gradients common in the ceramic substrate during cooking or baking. The temperature gradients that exist near the heat source and between the surface of the food and the air provide a harsh environment that tends to degrade and break down non-stick coatings. These temperature gradients add to the above-described difficulty in bonding the non-stick coating to the glazed surfaces and further increase the difficulty of producing ceramic cookware with a reliable non-stick coating.

Different types of ceramic cookware experience different cooking conditions that directly affect the intensity of the temperature gradients. Ceramic cooking appliances such as slow-cookers typically experience more extreme temperature gradients than baking dishes or casserole dishes due in part to the type and location of the heat source and the long cook times associated with slow-cooker applications. Unlike baking or casserole dishes used in the microwave or conventional oven for relatively short cook times, slow-cookers have heating elements in direct or near-direct contact with the ceramic cooking vessel, thereby generating localized and longer-lasting intense heat that creates sharper temperature gradients over the cooking vessel. Also, slow-cookers are often exposed to cool ambient temperatures at the food/air interface. As it is being cooked, the hot food is in contact with a portion of the ceramic cooking vessel while ambient air contacts the vessel just above the surface of the food. This interface experiences another temperature gradient that can be sharper than those associated with baking or casserole dishes used in warmer environments such as ovens or microwaves. As any slow-cooker user knows, it is these areas (the area adjacent the heating element and the interface between the top of the food and the air), that experience the most stuck-on, baked-on and caked-on food remains.

In addition to harsher cooking applications, ceramic slow-cookers are also more difficult to clean than common ceramic cookware. Even assuming that the ceramic cooking vessel of a slow-cooker is removable, it is typically bulky and burdensome to clean. It likely does not fit in a dishwasher and often does not even fit in the sink. If the ceramic cooking vessel is not removable from the slow-cooker housing, clean-up is further complicated as the cooking vessel cannot be submerged due to the electronics inside the housing. Maneuvering the slow-cooker to achieve proper cleaning is difficult and troublesome. This cleaning burden is greatly increased when food is baked on to the ceramic cooking vessel. The excessive scrubbing required to remove the stuck-on food is complicated by the bulky and unmanageable shape and size of the typical slow-cooker.

In light of the problems and limitations of the prior art described above, a need exists for ceramic cookware (and more preferably for a ceramic slow-cooker) that has a reliable and long-lasting non-stick coating that simplifies use and cleaning. Each preferred embodiment of the present invention achieves one or more of these results.

SUMMARY OF THE INVENTION

The present invention alleviates the problems associated with applying non-stick coatings to ceramic cookware and more particularly to ceramic slow-cookers. The present invention provides a slow-cooker that includes a reliable non-stick coating on the ceramic cooking vessel and provides a method for applying non-stick coating to a ceramic substrate suitable for use with a ceramic slow-cooker. The problems discussed above with respect to using and cleaning slow-cookers call for a non-stick surface that can be applied to the ceramic cooking vessel of a slow-cooker and that can stand up to the harsh cooking environment, thereby simplifying serving and clean-up.

More specifically, the invention provides a slow-cooker comprising a housing, a ceramic cooking vessel received within the housing, the ceramic vessel having interior surfaces defining a cavity and having a non-stick coating covering at least a portion of the interior surfaces and a heating element mounted within the housing for supplying heat to the ceramic vessel.

Preferably, the slow-cooker has a non-stick coating that is multi-layered and includes a first layer preferably having a dry film thickness (DFT) of approximately 0.3–0.5 mils. As used herein, the term "dryfilm thickness" and "DFT" refers to the thickness of a film after it is dried from a previously liquid state as is commonly understood in the art. The term "mil" refers to a unit of measurement equal to $\frac{1}{1000}$ of an inch as is commonly understood in the art. More preferably, the non-stick coating includes a first layer having a DFT of approximately 0.4 mils. Also preferably, the non-stick coating includes a second layer having a DFT of approximately 0.3–0.6 mils, and more preferably a second layer having a DFT of approximately 0.4–0.5 mils. Also preferably, the non-stick coating includes a third layer having a DFT of approximately 0.05–0.5 mils, and more preferably a third layer having a DFT of approximately 0.1–0.2 mils.

In most highly preferred embodiments of the present invention, the nonstick coating includes a first layer having a DFT of approximately 0.3–0.5 mils, a second layer having a DFT of approximately 0.3–0.6 mils and a third layer having a DFT of approximately 0.05–0.5 mils. Most preferably, the non-stick coating includes a first layer having a DFT of approximately 0.4 mils, a second layer having a DFT of approximately 0.4–0.5 mils and a third layer having a DFT of approximately 0.1–0.2 mils.

The invention also provides a method for making a non-stick ceramic cooking vessel for a slow-cooker, the method comprising the steps of applying a first layer of a non-stick coating over a ceramic cooking surface of the vessel, drying the first layer, cooling the first layer and applying a second layer of a nonstick coating over at least a portion of the first layer. The method preferably also includes applying a third layer of a non-stick coating over at least a portion of the first and second layers, more preferably before the second layer of non-stick coating is dry. The method is preferably completed by drying the second and third layers and then curing the layers of non-stick coating.

The present invention finds application on both glazed and unglazed ceramic cooking vessels for slow-cookers. Where the present invention is applied to ceramic cooking vessels having a glazing defining a seal over a cooking surface of the ceramic vessel, the method preferably comprises the steps of removing a portion of the glazing while maintaining at least a portion of the seal of the vessel and applying a non-stick coating over the cooking surface. The step of removing a portion of the glazing is preferably achieved by grit-blasting at least a portion of the glazing with aluminum oxide. Additionally, the cooking surface preferably includes a bottom surface and a wall surface wherein at least eighty-five percent of the glazing is preferably removed from at least a portion of the bottom surface and at least fifty percent of the glazing is preferably removed from at least a portion of the wall surface such that the seal remains substantially intact on the bottom surface and wall surface. More preferably, ninety-five to one hundred percent of the glazing is removed from at least a portion of the bottom surface such that the seal is substantially removed from the bottom surface, and at least 75 percent of the glazing is removed from at least a portion of the wall surface such that the seal remains substantially intact on the wall surface.

More information and a better understanding of the present invention can be achieved by reference to the following drawings and detailed description.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings:

FIG. 2 is a sectional view of the slow-cooker shown in FIG. 1; and

FIG. 3 is an enlarged view of a portion of the cooking surface of the slow-cooker shown in FIG. 2.

Figure 1:
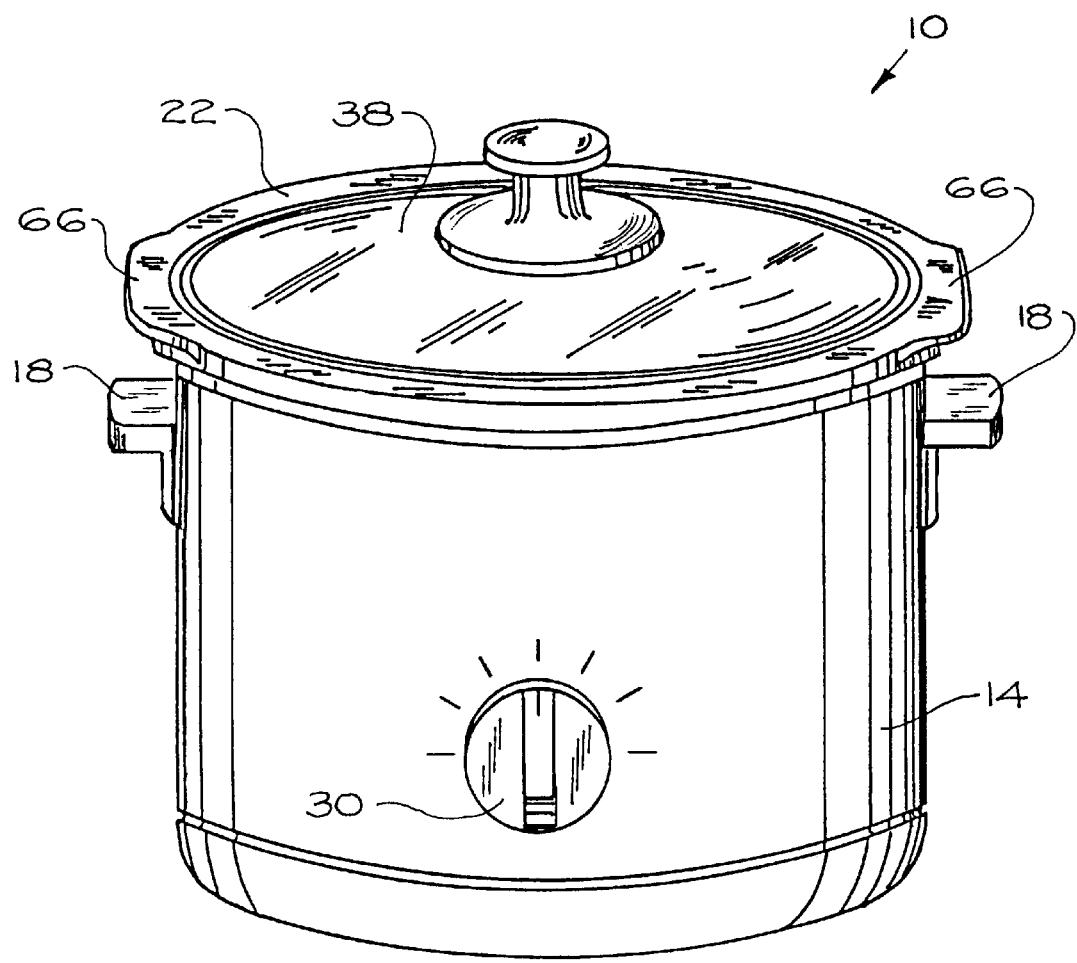
FIG. 1 is a perspective view of a ceramic slow-cooker according to a preferred embodiment of the present invention.

It is to be understood that the phraseology and terminology used herein is for the purpose of description only and should not be regarded as limiting. The use of "including" and "comprising" and variations thereof herein is meant to encompass the items listed thereafter and equivalents thereof as well as additional items. The use of letters to identify steps of a method or process is simply for identification and is not meant to indicate that the steps should be performed in a particular order.

DETAILED DESCRIPTION OF THE PREFERRED EMBODIMENT

FIGS. 1 and 2 illustrates the slow-cooker 10 of the present invention. Although the present invention is shown applied to the particular slow-cooker of FIGS. 1–3, it should be noted that the present invention finds application to any slow-cooker, regardless of shape and proportions. The slow-cooker 10 includes a housing 14, handles 18, a ceramic cooking vessel 22 received within the housing 14, a heating element 26 mounted within the housing 14 for supplying heat to the ceramic vessel 22 and a control member 30, preferably on the housing 14, for controlling the temperature of the heating element 26. Preferably, the slow-cooker 10 also includes legs 20 mounted to the housing 14 and a cover 38 removably located over the ceramic vessel 22. A power cord 42 preferably supplies power from a power source 34 to the heating element 26. The power source 34 is most preferably a standard electrical power source such as a 120 or 240 volt source.

The ceramic cooking vessel 22 includes an interior wall cooking surface 46 having a rim 50, and an interior bottom cooking surface 54. Together the wall cooking surface 46 and bottom cooking surface 54 define a cavity 58 and the rim 50 defines an opening 62. Vessel handles 66 preferably extend from the rim 50 and are preferably substantially parallel to the bottom surface 54. In the illustrated preferred embodiment, the ceramic cooking vessel 22 is round such that the opening 62 is substantially circular. Alternatively, the vessel 22 can be oval-shaped such that the opening 62 is substantially oval-shaped. Furthermore, the illustrated embodiment depicts a vessel 22 that is removable from the housing 14, but the invention is also capable of being practiced with slow-cookers 10 having a non-removable ceramic cooking vessel as is well known in the art (not shown).

The interior cooking surfaces 46, 54 of most ceramic cooking vessels for slow-cookers typically originally include a glazing layer 70 that defines a seal over the interior cooking surfaces 46, 54. The glazing layer 70 can also cover the rim 50, the handles 66 and any other portion of the vessel 22. The glazing layer 70 usually has a somewhat glossy appearance and substantially seals the otherwise porous ceramic substrate of the cooking surfaces 46, 54, preventing the penetration of liquids into the ceramic substrate. As will be described below, the glazing layer 70 can be partially or completely removed from the interior cooking surfaces 46, 54, the rim 50 or the handles 66.

The ceramic vessel 22 also includes a non-stick coating 74 covering at least a portion of the interior cooking surfaces 46, 54. Preferably, the non-stick coating 74 also covers the rim 50 and the handles 66, and can also cover any other portion of the vessel 22 if desired. The non-stick coating 74 provides a durable and reliable low-friction surface that substantially prevents the food being cooked (not shown) in the slow-cooker 10 from sticking to the surfaces coated. In the illustrated embodiment, the non-stick coating 74 comprises multiple layers, and more preferably, three layers. An example of such non-stick coating material is that available from Akzo Nobel Non-Stick Coatings, LLC of Chicago, Ill.

The application of the preferred non-stick coating 74 of the present invention will be described in detail below and results in a three-layered non-stick coating 74 (see FIG. 3) over at least a portion of the interior cooking surfaces 46, 54 and preferably over at least a portion of the rim 50 and handles 66. The first layer or basecoat 78 preferably has a dryfilm thickness (DFT) of approximately 0.3–0.5 mils (0.0076–0.013 mm), and more preferably has a DFT of approximately 0.4 mils (0.010 mm). As used herein, the term "dryfilm thickness" and "DFT" refers to the thickness of a film after it is dried from a previously liquid state as is commonly understood in the art. The term "mil" refers to a unit of measurement equal to 1/1000 of an inch as is commonly understood in the art. The second layer or intercoat 82 preferably has a DFT of approximately 0.3–0.6 mils (0.0076–0.015 mm), and more preferably has a DFT of approximately 0.4–0.5 mils (0.010–0.013 mm). The third layer or topcoat 86 preferably has a DFT of approximately 0.05–0.5 mils (0.0013–0.013 mm), and more preferably has a DFT of approximately 0.1–0.2 mils (0.0025–0.005 mm).

The non-stick coating 74 can be applied to the interior cooking surfaces 46, 54, the rim 50 and the handles 66 regardless of whether only a portion or substantially all of the glazing layer 70 has been removed therefrom. Preferably, substantially all of the glazing layer 70 is removed from the interior bottom cooking surface 54 prior to application of the non-stick coating 74, but this need not be the case.

The non-stick coating 74 of the present invention preferably is applied as follows. First, the interior surfaces 46, 54, the rim 50, the handles 66 and any other desired portion of the ceramic vessel must be clean and free from oil, grease, water or any adhesive from decals or stickers, etc. Once clean, the portions of the vessel 22 desired to be coated with the non-stick coating 74 are preferably grit-blasted to remove at least a portion of the glazing layer 70 thereon. Removing at least a portion of the glazing layer 70 aids in bonding the non-stick coating 74 to the ceramic vessel 22 by providing a roughened surface to which the non-stick coating 74 can properly bond. Removal of the glazing layer 70 is preferably achieved using a 44–64 grit aluminum oxide blast that creates a profile 90 (see FIG. 3) measuring approximately 160–240 micro inches (0.004–0.006 mm). As used herein, the term "profile" refers to the ridges or valleys created during the gritblasting as is commonly understood in the art. The term "micro inch" refers to a unit of measurement equal to 1/1,000,000 of an inch as is commonly understood in the art. More preferably, a 54-grit aluminum oxide blast is used to create a profile 90 measuring approximately 180–220 micro inches (0.0046–0.0056 mm).

As noted above, the non-stick coating 74 can be applied to surfaces of the ceramic vessel that have no glazing and surfaces that have had a layer of the glazing removed. Therefore, it is important to note that the profile 90 made by grit-blasting can be created in the glazing layer 70 (as seen on the interior wall cooking surface 46 in FIG. 3) or in the ceramic substrate of the cooking vessel 22 (as seen on the interior bottom cooking surface 54 in FIG. 3).

Preferably, the grit-blasting removes at least eighty-five percent of the glazing layer 70 over at least a portion of the bottom cooking surface 54 and at least fifty percent of the glazing layer 70 over at least a portion of the wall cooking surface 46, the rim 50 and the handles 66 such that the reflective or glossy finish of the glazing layer 70 is removed, but the seal remains substantially intact. More preferably, ninety-five to one hundred percent of the glazing is removed from at least a portion of the bottom cooking surface 54 such that the seal is substantially removed from the bottom cooking surface 54, and at least seventy-five percent of the glazing is removed from at least a portion of the wall cooking surface 46, the rim 50 and the handles 66 such that the reflective or glossy finish of the glazing layer 70 is removed, but the seal remains substantially intact. In either case, a substantially uniform profile 90 is created that improves the bond between the non-stick coating 74 and the ceramic vessel 22. While grit-blasting with aluminum oxide is preferred, the invention also contemplates other known methods of removing the glazing layer 70 including, but not limited to, etching and sand-blasting.

With the grit-blasting complete, the vessel 22 is emptied of any grit or debris. Pressurized air can be used to aid in emptying the grit or debris. It is important that the grit-blasted surfaces do not come into contact with oils (such as from human fingers), as these oils can detrimentally affect the bonding of the non-stick coating 74 and can leave fingerprints that may only become visible after application and curing of the non-stick coating 74. Clean pressurized water and/or cleaning agents can also be used to remove grit and debris from the vessel 22.

Next, the first layer or basecoat 78 is applied over at least a portion of the interior cooking surfaces 46, 54, and preferably the rim 50 and handles 66 as well. The first layer 78 is applied using at least one, and preferably up to four spray guns (not shown) as is commonly known in the art. The first layer 78 is preferably applied to obtain a DFT of approximately 0.3–0.5 mils (0.0076–0.013 mm), and more preferably a DFT of approximately 0.4 mils (0.010 mm). The first layer 78 adheres to the profiles 90 and substantially seals the ceramic substrate of the bottom cooking surface 54 which became substantially unsealed when the glazing layer 70 was removed. Furthermore, the first layer 78 improves the existing seal over the wall cooking surface 46 and further protects against penetration of the ceramic substrate by food liquids.

Preferably, the first layer 78 is then dried until substantially dry to the touch. This is preferably achieved by flash drying the vessel 22 at a temperature of approximately 180–270 degrees Fahrenheit for approximately 2–6 minutes, and more preferably at a temperature of approximately 200–250 degrees Fahrenheit for approximately 3–5 minutes. Other drying techniques known in the art can also be used. After drying, the vessel 22 and first layer 78 are preferably cooled in ambient air while taking care that no dirt or debris sticks to the first layer 78.

When the first layer 78 is cool, the second layer or intercoat 82 is applied over the first layer 78 using at least one, and preferably up to five spray guns (not shown) as is commonly known in the art. The second layer 82 is preferably applied to obtain a DFT of approximately 0.3–0.6 mils (0.0076–0.015 mm), and more preferably a DFT of approximately 0.4–0.5 mils (0.010–0.013 mm). The second layer 82 adheres to the first layer 78.

The third layer or topcoat 86 is preferably applied over the second layer 82 while the second layer 82 is still wet. The third layer 86 is applied using at least one spray gun, and preferably only one spray gun (not shown) as is commonly known in the art. The third layer 86 is applied to obtain a DFT of approximately 0.05–0.5 mils (0.0013–0.013 mm), and more preferably a DFT of approximately 0.1–0.2 mils (0.0025–0.005 mm). The third layer 86 preferably adheres to, and partially mixes with, the second layer 82. The third layer 86 is preferably the final layer of non-stick coating 74 to be applied and provides the non-stick surface characteristics desired for the ceramic vessel 22.

The second and third layers 82, 86 are then dried until substantially dry to the touch. This is preferably achieved by flash drying the vessel 22 at a temperature of approximately 180–270 degrees Fahrenheit for approximately 2–6 minutes, and more preferably at a temperature of approximately 200–250 degrees Fahrenheit for approximately 3–5 minutes. Other drying techniques known in the art can also be used.

After the second and third layers 82, 86 are dry, the three layers 78, 82 and 86 are preferably cured by heating the vessel 22 for approximately 18–33 minutes at a temperature of up to approximately 900 degrees Fahrenheit, and more preferably for approximately 25–30 minutes at a temperature of up to approximately 850 degrees Fahrenheit. The non-stick coating 74 can be cured in any way commonly known in the art, but is preferably cured using a six-zone curing oven (not shown) having the temperature zones set at 400 degrees Fahrenheit, 520 degrees Fahrenheit, 820 degrees Fahrenheit, 810 degrees Fahrenheit, 800 degrees Fahrenheit and 800 degrees Fahrenheit respectively. The vessel 22 preferably moves at a fixed rate through each of the six zones. Alternatively, a four-zone curing oven (not shown) can be used, having the temperature zones set, for example, at 400 degrees Fahrenheit, 650 degrees Fahrenheit, 820 degrees Fahrenheit and 800 degrees Fahrenheit respectively. Again, the vessel 22 preferably moves at a fixed rate through each of the four zones. Other curing techniques known in the art can also be used.

After curing, the non-stick coating 74 and vessel 22 are preferably cooled in substantially still ambient air. Taking care not to cause surface cracking of the non-stick coating 74 or vessel 22, forced air from fans can be used to cool the vessels 22 if desired. If the forced air cools the vessel 22 too quickly cracks can form, usually around the handles 66.

The above-described application of non-stick coating 74 to the ceramic slow-cooker 10 produces a ceramic vessel 22 having excellent non-stick characteristics. The non-stick coating substantially prevents food from sticking to the vessel 22, especially in the areas of high temperature gradients, such as directly adjacent the heating element 26 and at the food/air interface. The non-stick coating 74 bonds well to both the glazed layer 70 and the ceramic substrate of the vessel 22 and is therefore durable and long-lasting. Because the food does not stick to the vessel 22, serving and clean-up are essentially trouble-free. Whether the vessel 22 is removable from the housing 14 or fixed to the housing 14, cleaning the slow-cooker 10 is simplified due to the fact that little or no food will be stuck to the vessel 22. No excessive scrubbing, submersing or manipulating is needed.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, the amount of glazing removed from any surface of the vessel 22 may vary as desired. Furthermore, the non-stick coating 74 can be applied to any combination of locations on the vessel 22 as desired. For example, the non-stick coating 74 can be applied only to the bottom surface 54, only to the wall surface 46 or to any other location or combination of locations as desired.

What is claimed is:

1. A slow-cooker for the preparation of food comprising:
   a housing;
   a ceramic cooking vessel received within the housing, the ceramic vessel having interior surfaces defining a cavity and having a multi-layered non-stick coating covering at least a portion of the interior surfaces the non-stick coating including a third layer having a dry film thickness of approximately 0.1–0.2 mils; and
   a heating element mounted within the housing for supplying heat to the ceramic vessel.

2. A method for making a non-stick ceramic cooking vessel for a slow-cooker, the method comprising the steps of:
   (a) applying a first layer of a non-stick coating over a ceramic cooking surface of the vessel;
   (b) drying the first layer;
   (c) cooling the first layer;
   (d) applying a second layer of a non-stick coating over a portion of the first layer; and
   (e) applying a third layer of a non-stick coating over at least a portion of the first and second layers at a dry film thickness of approximately 0.1–0.2 mils.

3. A method for making a non-stick ceramic cooking vessel for a slow-cooker, the method comprising the steps of:
   (a) applying a first layer of a non-stick coating over a ceramic cooking surface of the vessel;
   (b) drying the first layer;
   (c) cooling the first layer;
   (d) applying a second layer of a non-stick coating over a portion of the first layer; and
   (e) applying a third layer of a non-stick coating over at least a portion of the first and second layers before the second layer of non-stick coating is dry.

4. A method for making a non-stick ceramic cooking vessel for a slow-cooker, the method comprising the steps of:
   (a) applying a first layer of a non-stick coating over a ceramic cooking surface of the vessel;
   (b) drying the first layer;
   (c) cooling the first layer;
   (d) applying a second layer of a non-stick coating over a portion of the first layer;
   (e) applying a third layer of a non-stick coating over at least a portion of the first and second layers; and
   (f) drying the second and third layers by flash drying the ceramic cooking vessel for approximately 2–6 minutes at a temperature of approximately 180–270 degrees Fahrenheit.

5. A method for making a non-stick ceramic cooking vessel for a slow-cooker, the method comprising the steps of:
   (a) applying a first layer of a non-stick coating over a ceramic cooking surface of the vessel;
   (b) drying the first layer;
   (c) cooling the first layer;
   (d) applying a second layer of a non-stick coating over a portion of the first layer;
   (e) applying a third layer of a non-stick coating over at least a portion of the first and second layers; and
   (f) drying the second and third layers by flash drying the ceramic cooking vessel for approximately 3–5 minutes at a temperature of approximately 200–250 degrees Fahrenheit.

6. A method for making a non-stick ceramic cooking vessel for a slow-cooker, the vessel having glazing defining a seal over a cooking surface of the ceramic vessel, the method comprising the steps of:
   (a) removing at least a portion of the glazing while maintaining at least a portion of the seal of the vessel; and
   (b) applying a non-stick coating over the cooking surface with the steps of:
      (i) applying a first layer of a non-stick coating over the cooking surface;
      (ii) drying the first layer;

(iii) cooling the first layer;
(iv) applying a second layer of a non-stick coating over at least a portion of the first layer;
(v) applying a third layer of non-stick coating over at least a portion of the first and second layers;
(vi) drying the second and third layers; and
(vii) curing the layers of non-stick coating.

7. A method for making a non-stick ceramic cooking vessel for a slow-cooker, the vessel having glazing defining a seal over a cooking surface of the ceramic vessel, the method comprising the steps of:

(a) removing at least a portion of the glazing while maintaining at least a portion of the seal of the vessel; and (b) applying a non-stick coating over the cooking surface; wherein the cooking surface includes a wall surface and wherein step (a) includes removing a portion of the glazing from the wall surface such that the seal remains substantially intact.

* * * * *